May 3, 1927.
M. P. EFFLEY
BUSH OR PLANT SUPPORT
Filed March 18, 1926
1,627,495
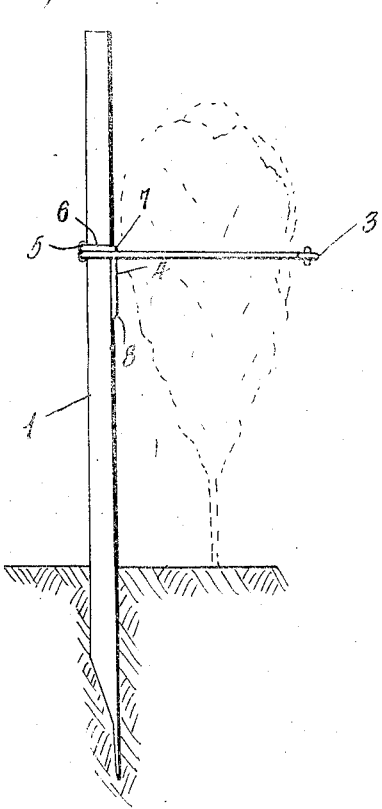
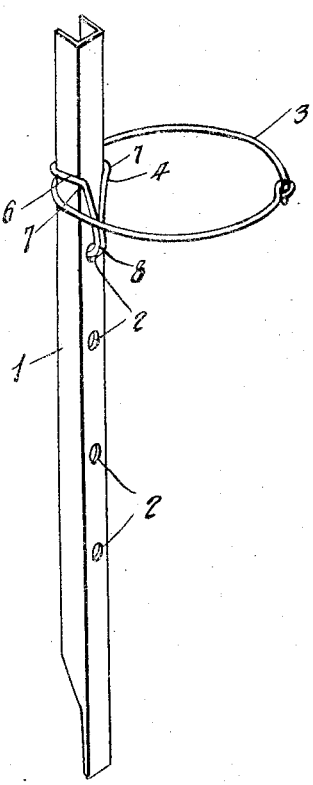
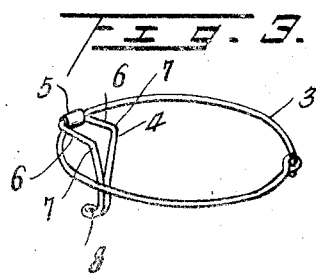
Inventor
M. P. Effley,
By [signature]
Attorney Patented May 3, 1927.

1,627,495

UNITED STATES PATENT OFFICE.

MICHAEL P. EFFLEY, OF LOWVILLE, NEW YORK, ASSIGNOR OF ONE-HALF TO E. H. BARNES, OF LOWVILLE, NEW YORK.

BUSH OR PLANT SUPPORT.

Application filed March 18, 1926. Serial No. 95,744.

The invention relates to means for supporting growing plants and bushes, and has for its object the provision of means for enclosing the foliage of the plant or bush and means for securing the enclosing device in adjusted positions to properly support the bushes or plants and also to adjust the support at different distances from the ground as the plant grows in height.

The invention will be described in detail hereinafter and will be found illustrated in accompanying drawings, in which—

Figure 1 is a view in elevation of the device showing it supporting a plant indicated in broken lines, Figure 2 is a perspective view of the device itself, and Figure 3 is a view in perspective of the enclosing ring.

In the drawings similar reference characters will be used to designate corresponding parts throughout the several views.

The plant support comprises a post 1 which may be made of channel steel as shown in the drawings or may be made of any other suitable material, and is adapted to be driven into the ground as shown in Figure 1, adjacent to the plant to be supported. Post 1 is provided with a series of openings 2 at varying elevations from the ground when the post is in position.

A supporting ring 3 to enclose the foliage of the plant is provided, said ring being preferably made of a strand of wire of sufficient gage to make the ring non-collapsible. The ring is provided with an internally extended loop 4 formed by crossing the wires on each side thereof as shown at 5, the two sides of the loop being adapted to embrace the sides of the post 1 as shown at 6 and the loop then bent downwardly as shown at 7 and converged and its end provided with a hook 8 to engage in the holes 2 to hold the ring in adjusted position.

It will be apparent that in use on a growing plant, the ring may be adjusted upwardly as the plant grows taller by releasing the hook 8 from the hole 2 in which it may be seated and placing it in the next hole above, or the device may be applied to a plant already grown and adjusted to suit the height of the plant, by means of the openings in the post 1.

What is claimed is:—

1. A plant support, comprising a post, a ring for enclosing a plant, said ring having a portion thereof surrounding and slidably mounted on the post, a hook on said ring, and means on said post to engage said hook to hold the ring.

2. A plant support, comprising a post, a ring for enclosing a plant slidably mounted on the post, said ring having a loop formed therein by crossing the material of the ring and adapted to embrace the post, a hook formed from said loop, and the post provided with means to engage the hook to hold the ring in position thereon.

In testimony whereof I affix my signature.

MICHAEL P. EFFLEY.